(12) United States Patent
Davidson

(10) Patent No.: US 10,133,272 B2
(45) Date of Patent: Nov. 20, 2018

(54) METHODS AND APPARATUS TO DEPLOY AND RECOVER A FIXED WING UNMANNED AERIAL VEHICLE VIA A NON-FIXED WING AIRCRAFT

(71) Applicant: Insitu, Inc. (a subsidiary of The Boeing Company), Bingen, WA (US)

(72) Inventor: Darcy Davidson, Dallesport, WA (US)

(73) Assignee: THE BOEING COMPANY, Chicago, IL (US)

( * ) Notice: Subject to any disclaimer, the term of this patent is extended or adjusted under 35 U.S.C. 154(b) by 140 days.

(21) Appl. No.: 14/706,723

(22) Filed: May 7, 2015

(65) Prior Publication Data
US 2016/0327945 A1  Nov. 10, 2016

(51) Int. Cl.
| | | |
|---|---|---|
| *G05D 1/00* | (2006.01) | |
| *B64C 39/02* | (2006.01) | |
| *B64D 5/00* | (2006.01) | |
| *B64D 47/08* | (2006.01) | |
| *G01S 19/07* | (2010.01) | |
| *G01S 19/13* | (2010.01) | |

(52) U.S. Cl.
CPC ......... *G05D 1/0027* (2013.01); *B64C 39/024* (2013.01); *B64D 5/00* (2013.01); *B64D 47/08* (2013.01); *G01S 19/07* (2013.01); *G01S 19/13* (2013.01); *B64C 2201/021* (2013.01); *B64C 2201/024* (2013.01); *B64C 2201/082* (2013.01); *B64C 2201/182* (2013.01)

(58) Field of Classification Search
None
See application file for complete search history.

(56) References Cited

U.S. PATENT DOCUMENTS

| | | | | |
|---|---|---|---|---|
| 4,261,533 A | * | 4/1981 | Roberts | B64C 5/10 244/213 |
| 5,000,398 A | * | 3/1991 | Rashev | B64C 27/08 244/110 E |
| 5,799,900 A | * | 9/1998 | McDonnell | B64C 29/02 244/115 |

(Continued)

FOREIGN PATENT DOCUMENTS

| | | |
|---|---|---|
| EP | 2727835 | 5/2014 |
| WO | 2014204550 | 12/2014 |

OTHER PUBLICATIONS

Extended European Search Report, issued by the European Patent Office in connection with European Patent Application No. 16168600.1 dated Jun. 9, 2016, 8 pages.

(Continued)

*Primary Examiner* — Nicholas K Wiltey
(74) *Attorney, Agent, or Firm* — Hanley, Flight & Zimmerman, LLC

(57) ABSTRACT

Example methods and apparatus to deploy and recover a fixed wing unmanned aerial vehicle via a non-fixed wing aircraft are described herein. An example method includes tracking a location of a non-fixed wing aircraft in flight, tracking a location of a fixed wing aircraft in flight, positioning the non-fixed wing aircraft relative to the fixed wing aircraft based on the locations of the non-fixed wing aircraft and the fixed wing aircraft and coupling, via a gripper, the fixed wing aircraft to the non-fixed wing aircraft in midflight at a recovery location.

15 Claims, 9 Drawing Sheets

(56) References Cited

U.S. PATENT DOCUMENTS

| | | | |
|---|---|---|---|
| 6,293,487 B1* | 9/2001 | Gaite | B64D 5/00 |
| | | | 244/3 |
| 8,038,090 B2* | 10/2011 | Wilson | B64C 39/024 |
| | | | 244/1 TD |
| 8,950,698 B1 | 2/2015 | Rossi | |
| 9,010,690 B1* | 4/2015 | Al-Heraibi | B64D 17/00 |
| | | | 244/100 R |
| 9,139,309 B1* | 9/2015 | Al-Heraibi | B64F 1/10 |
| 2005/0189450 A1* | 9/2005 | Roeseler | B64C 39/024 |
| | | | 244/63 |
| 2009/0322598 A1* | 12/2009 | Fly | G01S 19/20 |
| | | | 342/357.48 |
| 2010/0237183 A1 | 9/2010 | Wilson et al. | |
| 2010/0252674 A1* | 10/2010 | Lang | B64C 19/00 |
| | | | 244/36 |
| 2012/0048996 A1 | 3/2012 | Wilson et al. | |
| 2013/0082137 A1* | 4/2013 | Gundlach | B64C 25/68 |
| | | | 244/110 C |
| 2014/0117147 A1 | 5/2014 | Hanna et al. | |
| 2015/0115096 A1 | 4/2015 | Rossi | |
| 2015/0314871 A1 | 11/2015 | von Flotow | |
| 2015/0329205 A1 | 11/2015 | Hanna et al. | |
| 2017/0270807 A1* | 9/2017 | Fisher | G08G 5/02 |

OTHER PUBLICATIONS

Wikipedia, "McDonnell XF-85 Goblin," retrieved from [URL: http://en.wikipedia.org/wiki/McDonnell_XF-85_Goblin] on Feb. 17, 2015, 10 pages.

\* cited by examiner

METHODS AND APPARATUS TO DEPLOY AND RECOVER A FIXED WING UNMANNED AERIAL VEHICLE VIA A NON-FIXED WING AIRCRAFT

FIELD OF THE DISCLOSURE

This disclosure relates generally to deployment and recovery of a fixed wing unmanned aerial vehicle (UAV) and, more particularly, to methods and apparatus to deploy and recover a fixed wing UAV via a non-fixed wing aircraft.

BACKGROUND

A fixed wing aircraft, such as a fixed wing unmanned aerial vehicle (UAV), is typically launched from a runway or airstrip and recovered by landing the UAV on a runway or airstrip. In particular, to launch a fixed wing UAV, the UAV is propelled along a runway until the UAV reaches a speed at which it can generate enough lift to fly. To recover a fixed wing UAV, the UAV is directed onto a runway where the speed of the UAV is slowly decreased.

SUMMARY

An example method disclosed herein includes tracking a location of a non-fixed wing aircraft in flight, tracking a location of a fixed wing aircraft in flight, positioning the non-fixed wing aircraft relative to the fixed wing aircraft based on the locations of the non-fixed wing aircraft and the fixed wing aircraft and coupling, via a gripper, the fixed wing aircraft to the non-fixed wing aircraft in mid-flight at a recovery location.

An example apparatus disclosed herein includes a non-fixed wing aircraft and a processor. The processor of the example apparatus is to determine a location of the non-fixed wing aircraft, determine a location of a fixed wing aircraft to be retrieved by the non-fixed wing aircraft, instruct the non-fixed wing aircraft to a position relative to the fixed wing aircraft and instruct the non-fixed wing aircraft to couple to the fixed wing aircraft.

Another example method disclosed herein includes instructing a fixed wing aircraft to fly towards a recovery area and tracking a location of the fixed wing aircraft using a first tracking device when the fixed wing aircraft is a first distance from the recovery area. The example method also includes tracking the location of the fixed wing aircraft using a second tracking device, different than the first tracking device, when the fixed wing aircraft is a second distance from the recovery area and retrieving the fixed wing aircraft with a non-fixed wing aircraft mid-flight at the recovery area.

BRIEF DESCRIPTION OF THE DRAWINGS

In FIG. 1, the example rotorcraft is depicted as carrying the example fixed wing UAV to an elevation during a first phase of an example launch operation implemented in accordance with the teachings of this disclosure.

Figure 1:
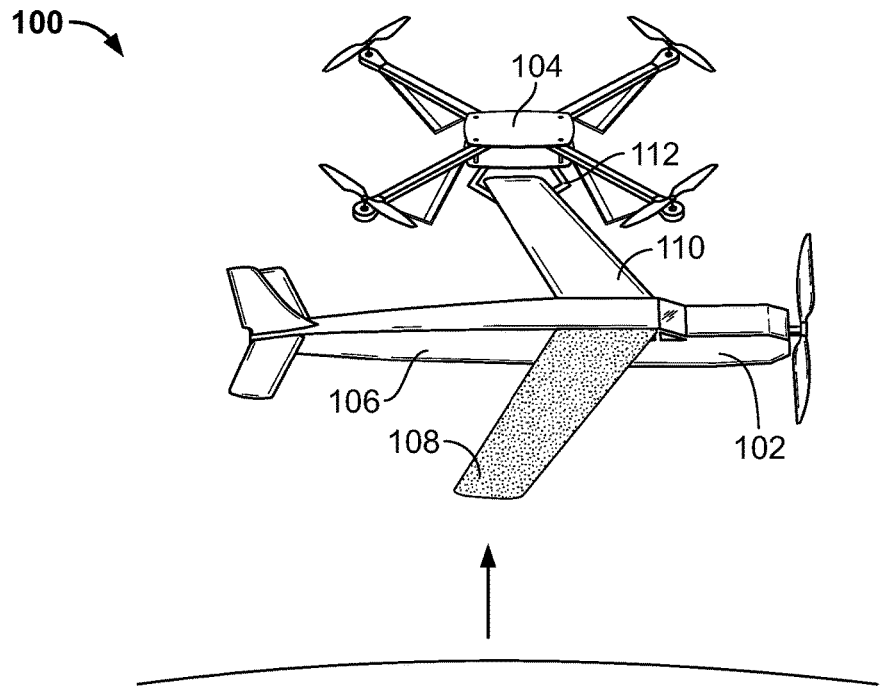
FIG. 1 illustrates an example fixed wing unmanned aerial vehicle (UAV) deployment and recovery system that includes an example rotorcraft and an example fixed wing UAV.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

A fixed wing aircraft, such as a fixed wing unmanned aerial vehicle (UAV) (e.g., a drone), is typically deployed from a runway or airstrip and recovered by landing the aircraft on a runway or airstrip, similar to a commercial aircraft. However, this method of deploying and recovering a fixed wing UAV requires a relatively large amount of space to accommodate a runway. In other words, a relatively flat and open space is needed to launch and recover the UAV. In many instances, such as in reconnaissance missions, runways are not readily available. Further, launching and/or recovering a UAV from an airstrip may result in the UAV and/or a remote operation station being exposed.

Some known systems (e.g., an unmanned aerial system (UAS)) have been implemented to deploy UAVs using a launcher. The launcher includes a hook that attaches to the UAV and accelerates rapidly along a short path to propel the UAV into the air. However, these known launchers are relatively heavy and are generally towed (e.g., via a vehicle) to a launch site. Additionally, the launchers cannot recover the UAV. Therefore, a separate recovery system is needed to recover the UAV. One known UAV recovery system uses a cable that hangs downward from the top of a tall boom or crane. The UAV is flown into the cable, which then snags one of the wings of the UAV. However, similar to the launchers, this known recovery system includes equipment that is extremely heavy and must be towed to a recovery site. Also, because the launch and recovery systems employ different equipment, both pieces of equipment are necessary to deploy and recover a UAV. Further, these launching and recovery operations generally require the UAV to be structurally rigid to withstand the impacts and loads on the UAV during launch and recovery. Therefore, the UAV must be designed to be more structurally rigid and, thus, is relatively heavy.

The example methods and apparatus disclosed herein enable a fixed wing aircraft, such as fixed wing UAV, to be deployed and/or recovered using a non-fixed wing aircraft. A fixed wing UAV is an aircraft that includes one or more fixed wings and a propulsion system to generate thrust, such as one or more propellers, turbo-jets or other thrust generation devices. A non-fixed wing aircraft, referred to as a rotorcraft or rotary-wing aircraft, is an aircraft that uses lift generated by wings or propellers, referred to as rotary wings or rotor blades, that revolve around a mast. A rotorcraft may include one or multiple rotor blades (e.g., rotor assemblies) mounted on a single mast or multiple masts. For example, a quadcopter is a multi-rotor rotorcraft that generates lift via four rotor blades. In the illustrated examples disclosed herein, the rotorcraft is an unmanned rotorcraft, which is controlled via a remote communications station and/or programmed instructions. However, in other examples, the rotorcraft may be a manned vehicle.

An example launch method or operation disclosed herein includes employing a rotorcraft to carry a fixed wing UAV vertically to a desired elevation and releasing the UAV to deploy (e.g., launch) the UAV. In some examples, the rotorcraft includes a gripper (e.g., a claw) that couples to the fuselage or wing(s) of the UAV. In some examples, when launching the UAV, the UAV is activated to generate thrust, thereby propelling the UAV and the rotorcraft. Once the UAV (and the rotorcraft) is traveling at a desired speed, the rotorcraft releases the UAV (e.g., by releasing the UAV from the gripper). The example method enables the UAV to be deployed without a relatively large horizontal space, which is typically needed for runway launches. In other words, the example rotorcraft can lift a UAV vertically with minimal horizontal space required (e.g., within a relatively small footprint). For example, the rotorcraft may be used to launch the UAV in a substantially covered area, such as in a forest or other dense environment that would normally prevent the use of a runway launch. The example rotorcraft and UAV apparatus may also be launched from a rocky area, or an uneven terrain, such as a mountain, where a runway launch may also not suffice. Therefore, the example methods and apparatus disclosed herein enable a fixed wing UAV to be deployed in more environments, in a safer manner, and with less equipment. Further, the rotorcraft may be relatively small and may be carried by a single person. Therefore, deploying the UAV can be performed without having to haul heavy equipment to a launch site.

An example recovery method or operation disclosed herein employs the rotorcraft to intercept and retrieve the fixed wing UAV mid-flight (e.g., mid-air). The UAV may be instructed to fly according to a particular trajectory toward to a recovery area (e.g., a recovery location, zone, position, etc.). While the UAV is flying, the rotorcraft is directed to fly adjacent the UAV and approach the UAV. Once in close proximity, the rotorcraft couples to the UAV and both the rotorcraft and the UAV may be slowed down and landed to recover the UAV. As mentioned above, the rotorcraft may include a gripper to grasp the fuselage of the UAV and/or the wing(s) of the UAV during recovery of the UAV.

To enable the rotorcraft to be positioned relative to the UAV (e.g., along a side or top of the UAV) and intercept the UAV, the locations of the UAV and the rotorcraft are tracked. Additionally, based on the locations of the UAV and the rotorcraft, the speeds, attitudes and/or trajectories (e.g., flight paths) of the UAV and the rotorcraft can also be determined. In particular, the example methods and apparatus disclosed herein enable the UAV and the rotorcraft to be tracked so that their locations and trajectories can be aligned for recovery. In some examples, to accurately track the location of the UAV, the UAV is tracked using different tracking devices or systems at different stages or phases of the recovery operation. For example, in a long range phase (e.g., a first phase), the locations of the rotorcraft and the UAV may be tracked using a Global Positioning System (GPS). The long range phase may occur when the UAV and the rotorcraft are relatively far from each other, such as several miles from each other. The rotorcraft and the UAV include GPS receivers to track their respective locations. In some examples, the locations are transmitted to a remote communications station (e.g., a ground station). The remote communications station may transmit flight intent instructions to the UAV and/or the rotorcraft to direct the UAV and/or the rotorcraft to the designated recovery area. The UAV and/or the rotorcraft may include an air-to-ground communication (AGC) system to communicate with the remote communications station. In some examples, the rotorcraft is deployed at the recovery area and the UAV is instructed to fly along a trajectory that intersects the location of the rotorcraft.

In some examples, when the fixed wing UAV and the rotorcraft are in an intermediate or middle range phase (e.g., a second phase), the locations of the UAV and/or the rotorcraft are tracked based on differential GPS (DGPS) coordinates. The intermediate phase may occur when the fixed wing UAV and the rotorcraft are within about 50-100 yards of each other, for example.

The rotorcraft and/or the UAV may communicate their respective coordinates to the remote communications station. In general, DGPS is an enhancement to the GPS that provides improved location accuracy (e.g., from the 15-meter nominal GPS accuracy to about 10 centimeters (cm)). DGPS involves one or more references or fixed ground-based reference stations that broadcast the difference between the positions indicated by the GPS satellites and the known fixed positions of the ground-based reference stations. The difference between the measured satellite pseudoranges and the actual internally stored ranges is determined and broadcast to other GPS receivers, such as the GPS receivers of the UAV and the rotorcraft. Therefore, the GPS receivers may then correct their pseudoranges by the same or similar amount. As the UAV nears the recovery area, the rotorcraft can accurately track the location of the incoming UAV using coordinates from the DGPS (e.g., communicated via the AGC system). Additionally or alternatively, the UAV and the rotorcraft may employ an infrared (IR) sensor (e.g., an IR camera) to track the relative locations, speeds, attitudes and/or flight paths of the UAV and the rotorcraft. In some examples, the IR sensor is implemented as an IR camera carried by the rotorcraft. As the rotorcraft approaches the UAV, the rotorcraft tracks the location of the UAV with measurements from the IR camera. In some examples, IR tape and/or markings may be provided on the UAV to increase the ability of the IR camera to detect the location, speed, attitude and/or flight path of the UAV. Based on the locations measured using the DGPS and/or the IR camera, the location, attitude, speed and/or flight path of the rotorcraft can be adjusted to more accurately intersect the trajectory of the UAV at the recovery area. In other examples, the IR camera may instead be employed in the UAV (e.g., which may then communicate the tracked locations to the rotorcraft via the AGC system).

In some examples, when the fixed wing UAV and the rotorcraft are in a close range phase (e.g., a third phase), the IR camera may be used to determine or track the location, speed, attitude and/or flight path of the UAV. The close range phase may begin when the fixed wing UAV and the rotorcraft are within about 50 yards of each other, for example. In some examples, only the IR camera may be used to track the location of the UAV. Based on the measurements from the IR camera, the rotorcraft can detect the location, speed, attitude and/or flight path of the approaching UAV. As such, the location, attitude, speed and/or flight path of the rotorcraft can be further adjusted to intercept the fixed wing UAV at the recovery area. The distances of the long, intermediate and/or close range phases may be longer or shorter, as desired. In some examples, more or fewer range phases may be utilized and/or additional or fewer tracking devices may be used.

The example methods and apparatus disclosed herein also enable a fixed wing UAV to be relatively lighter than known UAVs, because the UAV is not required to as rigid (e.g., via additional structural support) as UAVs that are to be landed on a runway or snagged by a hanging cable. Instead, the rotorcraft of the example methods and apparatus gently retrieves the UAV mid-flight. As such, the wings of the UAV may be lighter, which also increases the endurance and performance of the UAV. Also, because the UAV can be lighter, the payload of the UAV can be increased. Further, the longevity of the UAV is substantially increased due to decreased impacts from normal launch and recovery systems. The example methods and apparatus also provide a more mobile or portable launch and recovery operation because the footprint or space required is significantly reduced. Also, because the rotorcraft can be used to launch and recover the UAV, launching and recovering a UAV does not require two separate launch and recovery devices, as described in the known systems above.

Figure 2:
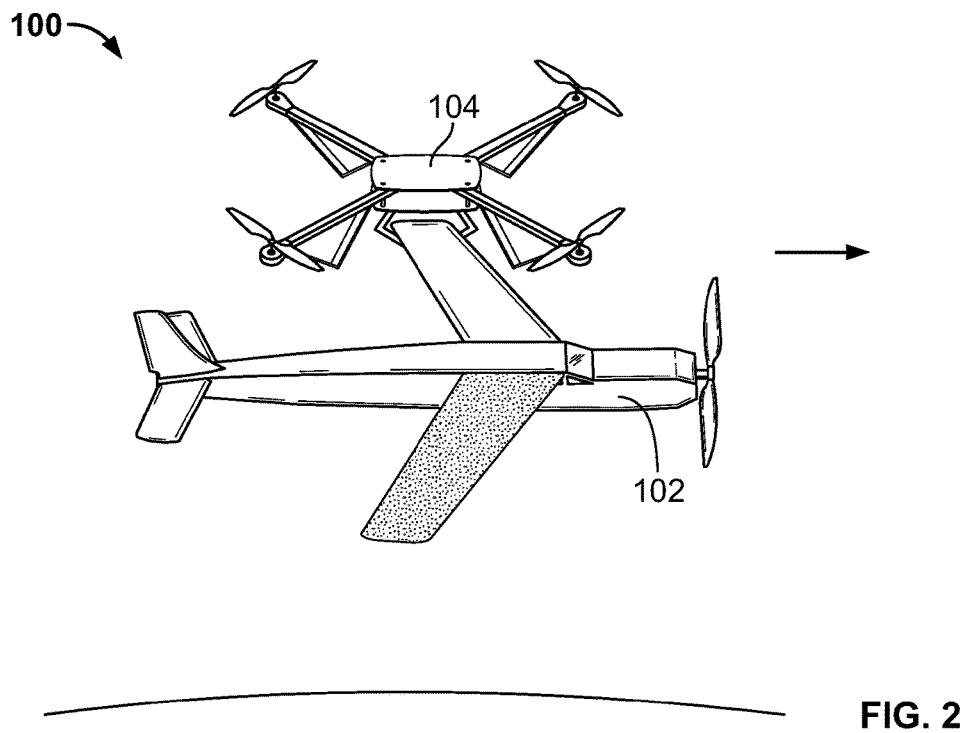
FIG. 2 illustrates the example fixed wing UAV deployment and recovery system of FIG. 1 when the example fixed wing UAV is activated for flight during a second phase of the example launch operation.
Figure 3:
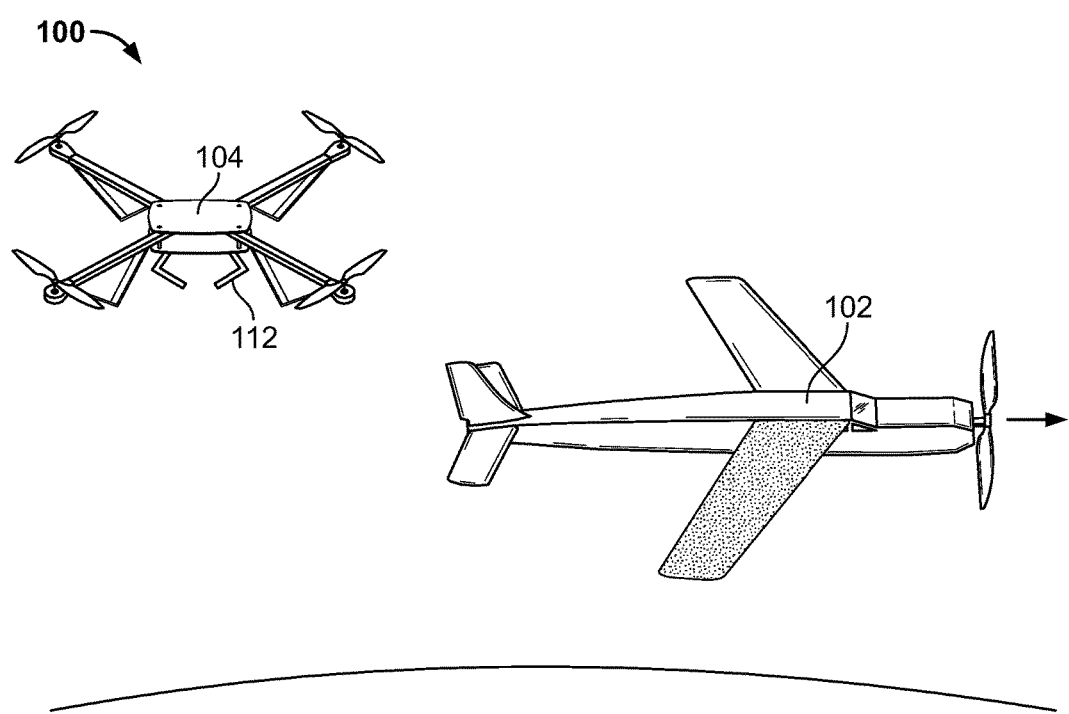
FIG. 3 illustrates the example fixed wing UAV deployment and recovery system of FIG. 1 after the UAV has been uncoupled from the rotorcraft during a third phase of the example launch operation.

An example system 100 to deploy and/or recover a fixed wing UAV 102 using a rotorcraft 104 is illustrated in FIG. 1. FIGS. 1, 2 and 3 illustrate an example launch operation or sequence that may be implemented to deploy the fixed wing UAV 102 of the example system 100. In the illustrated example, the fixed wing UAV 102 has a fuselage or body 106 and wings 108, 110 extending from the fuselage 106. The example fixed wing UAV 102 may be programmed to fly along a designated flight path (e.g., via flight intent instructions) and/or may be manually controlled via a remote control system.

In the illustrated example, the rotorcraft 104 is depicted as a quadcopter having four rotor assemblies for lifting and controlling the movement of the rotorcraft 104. However, the example rotorcraft 104 may be implemented as any other type of rotorcraft having more or fewer rotor assemblies. To releaseably couple the UAV 102 to the rotorcraft 104, the rotorcraft 104 includes a clamp or gripper 112 (e.g., a claw). The gripper 112 includes two or more arms that are actuated to grab or grip the UAV 102. In other examples, the gripper 112 may be implemented as another type of fastening or coupling mechanism. For example, the rotorcraft 104 may instead include a tether, a hook, a claw or any other suitable coupling mechanism. In the illustrated example, the gripper 112 is designed to couple to one of the wings 108, 110 of the UAV 102. Additionally or alternatively, the rotorcraft 104 may be designed to couple to the fuselage 106 of the UAV and/or any other part of the UAV 102.

In FIG. 1, the rotorcraft 104 is illustrated as carrying the UAV 102 vertically upward to a desired elevation. The rotorcraft 104 may be sized and powered to lift the UAV 102. For example, the UAV 102 may weigh 50-60 pounds, and the rotorcraft 104 may be sized and powered to carry such weight. In other examples, the UAV 102 may weigh more or less, and the rotorcraft 104 can be sized and powered accordingly.

Once the rotorcraft 104 and the UAV 102 are at an elevation sufficient for the UAV to be launched, the UAV 102 and/or the rotorcraft 104 is activated to propel the UAV 102 in the direction of travel, as illustrated in FIG. 2. The example UAV 102 may include a propeller, a turbo-jet or any other thrust generation device known to those of skill in the art. When the UAV 102 is traveling at a desired speed (e.g., fast enough for the UAV 102 to maintain flight), the rotorcraft 104 actuates the gripper 112 to release the UAV 102, as illustrated in FIG. 3. The rotorcraft 104 may then be landed and retrieved. The example system 100 enables the UAV 102 be deployed within a relatively small footprint (e.g., a small horizontal space). The UAV 102 may be launched in a tree covered area, for example, where the rotorcraft 104 can be operated to launch the UAV 102 from above the tree canopy. Additionally, as a result, any operator(s) or ground control person(s) can be remain covered by the tree canopy.

Figure 4:
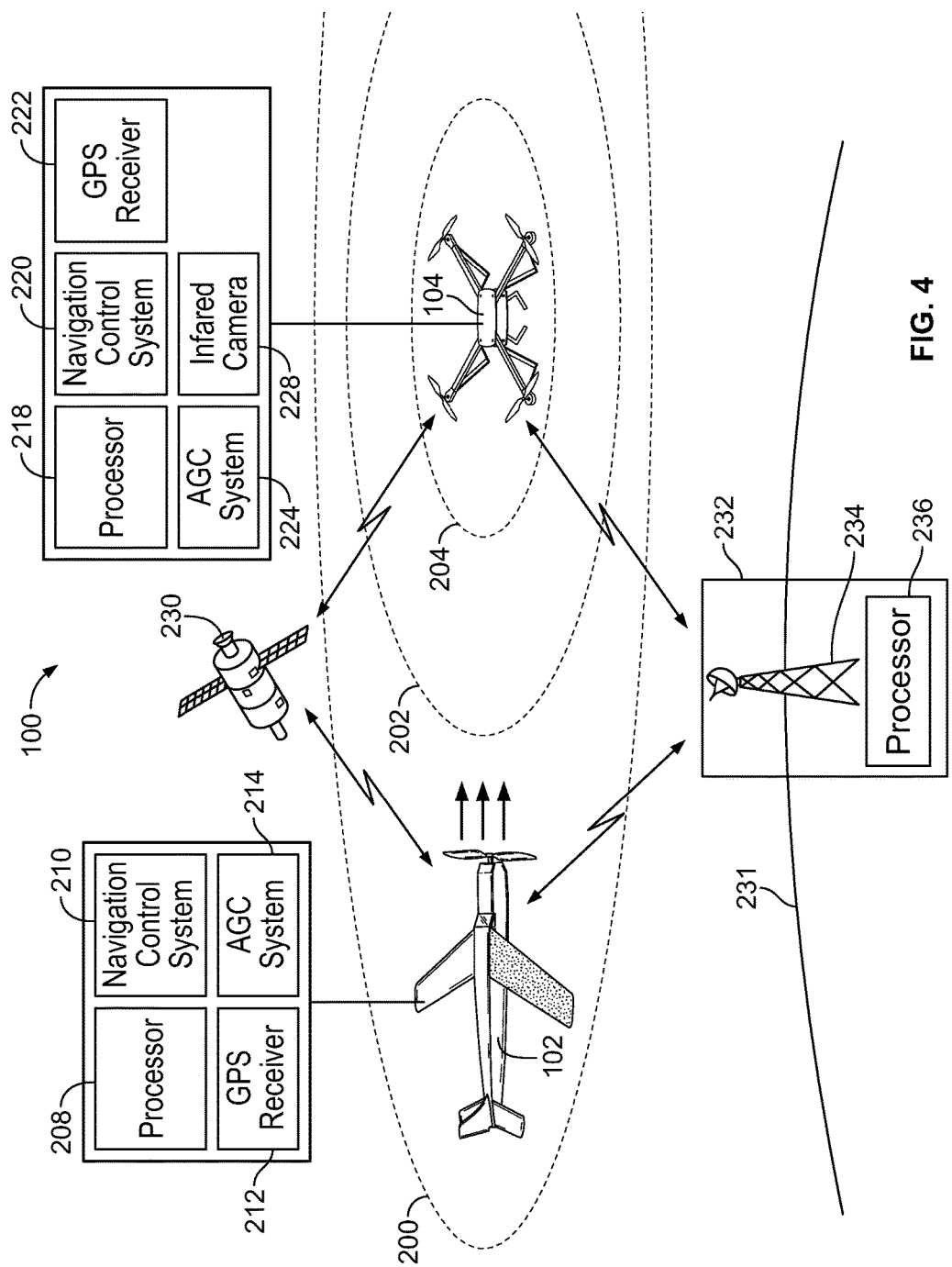
FIG. 4 illustrates the example fixed wing UAV deployment and recovery system of FIG. 1 during a first phase of an example recovery operation implemented in accordance with the teachings of this disclosure.
Figure 5:
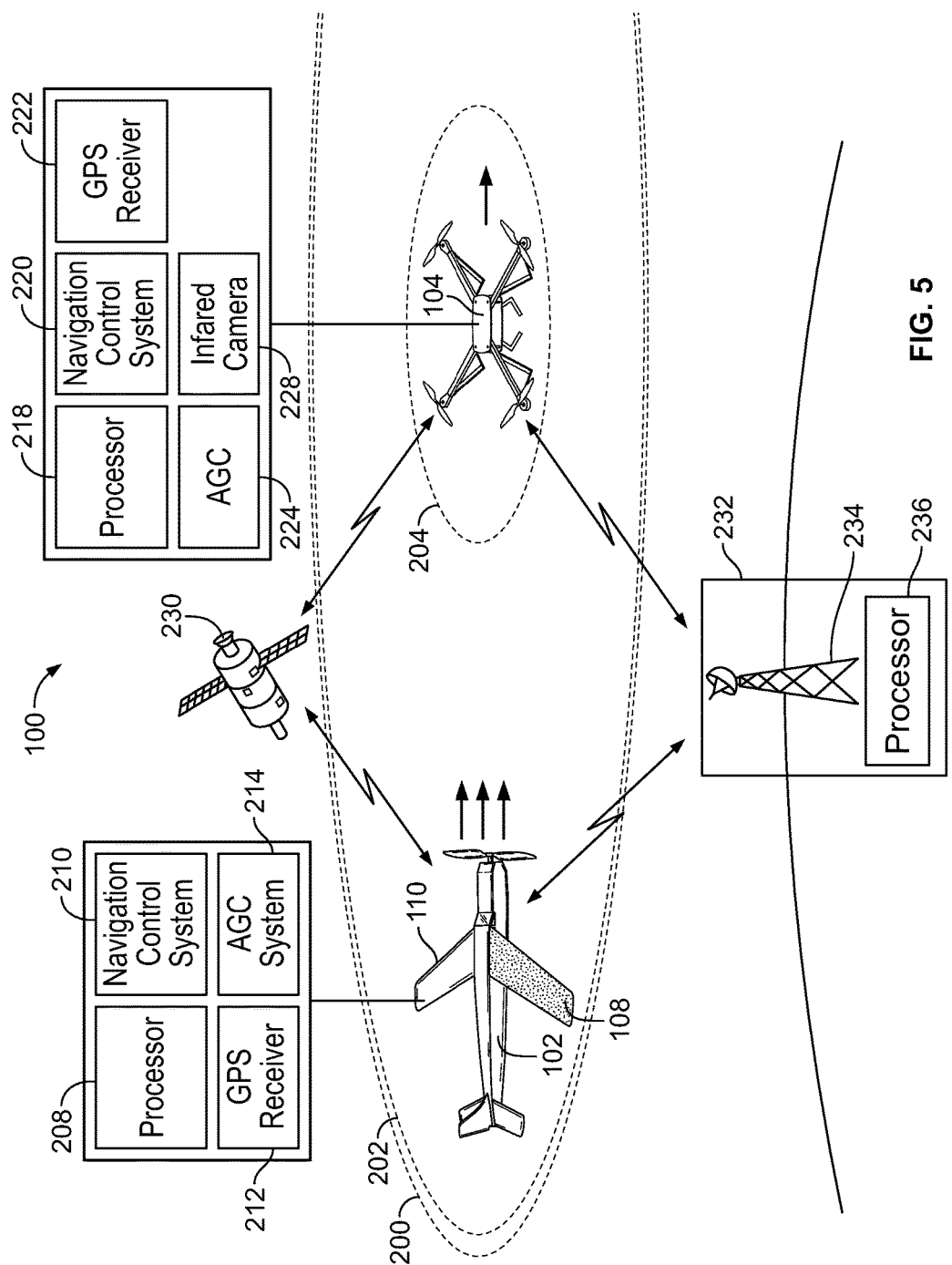
FIG. 5 illustrates the example fixed wing UAV deployment and recovery system of FIG. 4 during a second phase of the example recovery operation.
Figure 6:
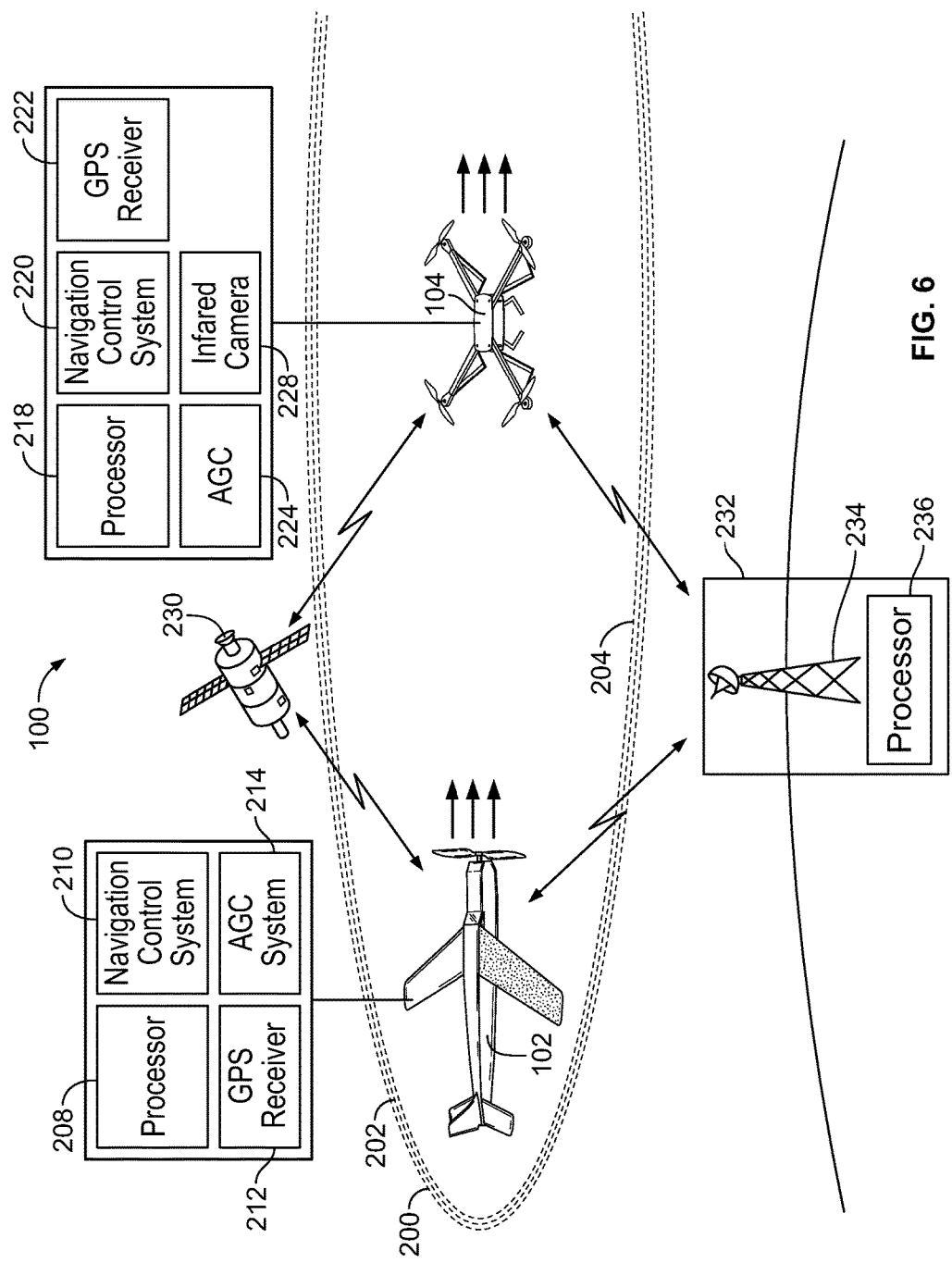
FIG. 6 illustrates the example fixed wing UAV deployment and recovery system of FIG. 4 during a third phase of the example recovery operation.

FIGS. 4, 5 and 6 illustrate an example recovery sequence or operation that may be performed by the example system 100 to recover the UAV 102 using the rotorcraft 102 to intercept the UAV 102 mid-flight. To recover the UAV 102, the UAV 102 is directed to flight to a recovery area (e.g., recovery location, position, zone, etc.). In the illustrated example, the recovery area is the location or proximate location of the rotorcraft 104. As the UAV 102 approaches the recovery area, the rotorcraft 104 is positioned relative to the UAV 102 to intercept (e.g., cross flight paths) and couple to the UAV 102. For example, the rotorcraft 104 may be instructed to fly parallel to and gradually approach the UAV 102 from a side, where the rotorcraft 104 can then attach to one of the wings 108, 110 and/or fuselage 106 of the UAV 102.

To track the location of the UAV 102 and/or the rotorcraft 104 during flight, the example system 100 employs tracking devices to track the locations of the UAV 102 and/or the rotorcraft 104 and communication systems to communicate the locations of the UAV 102 and/or the rotorcraft 104. In the illustrated example, the system 100 uses different tracking devices and/or communication systems to coordinate the recovery of the UAV 102 based on the distance between the UAV 102 and the rotorcraft 104. In particular, three phases are illustrated in FIGS. 4, 5 and 6: a long range phase 200, an intermediate range phase 202, and a close range phase 204. The long range phase 200 may be any distance over 100 yards, for example, the intermediate range phase 202 may be from 50-100 yards, for example, and the close range phase may be any distances less than 50 yards, for example.

However in other examples, the distances of each of the ranges 200, 202, 204 may be more or less. Additionally, more or fewer range phases may be implemented.

As illustrated in FIGS. 4, 5 and 6, the UAV 102 includes a processor 208, a navigation control system 210, a Global Positioning System (GPS) receiver 212 and an air-to-ground communication (AGC) system 214. The rotorcraft 104 includes a processor 218, a navigation control system 220, a GPS receiver 222, an AGC system 224 and an infrared (IR) camera 228. When the UAV 102 is in the long range phase 200, as illustrated in FIG. 4, the locations of the UAV 102 and/or the rotorcraft 104 are tracked based on GPS coordinates. In the illustrated example, a satellite 230 is depicted as orbiting Earth 231. The satellite 230 represents the satellites employed for GPS tracking. The GPS receivers 212, 222 receive signals from the GPS satellites 230 and the processors 208, 218 determine the respective locations of the UAV 102 and the rotorcraft 104.

In the illustrated example of FIG. 4, the system 100 includes a remote communications station 232 such as a ground station or base station. The remote communications station 232 is depicted as a non-moving, terrestrial based communications station located on the Earth 231. However, in other examples, the communications station 232 may be located on another platform (e.g., a marine vessel) to form a mobile platform as well and, therefore, may not be stationary. In the illustrated example, the remote communications station 232 includes one or more antenna(s) 234 (e.g., transceivers, an AGC system) and a processor 236. The remote communications station 232 communicates with the UAV 102 and the rotorcraft 104 via the antenna(s) 234. When the UAV 102 is in the long range phase 200, the UAV 102 and/or the rotorcraft 104 communicate their respective locations to the remote communications station 232 via the respective AGC systems 214, 224. Additionally or alternatively, the UAV 102 and/or the rotorcraft 104 may communicate their respective locations to the remote communications station 232 via the satellite(s) 230. The remote communications station 232 may communicate the location of the rotorcraft 104 to the UAV 102 and/or the location of the UAV 102 to the rotorcraft 104. Based on the locations of the UAV 102 and the rotorcraft 104 (or the recovery area), the navigation control system 210 operates to fly the UAV 102 toward the rotorcraft 104. The navigation control system 210 may include systems to control the various lift and control surfaces on the UAV 102 and the propulsion system of the UAV 102. In some examples, the remote communications station 232 transmits flight intent instructions to the UAV 102. The flight intent instructions may include instructions used to fly the UAV 102 along a desired trajectory or flight path towards the rotorcraft 104 or recovery area. In other examples, the processor 208 may determine and execute a trajectory or flight path based on the relative locations of the UAV 102 and the rotorcraft 104.

FIG. 5 illustrates the example UAV 102 traveling in the intermediate range phase 202. In general, GPS tracking is only accurate within a certain range (e.g., about 15 meters). To track the location of the UAV 102 in the intermediate phase range 202, the system 100 may use coordinates from a Differential Global Positioning System (DGPS). In general, the DGPS is an enhancement to regular GPS that provides improved location accuracy. The DGPS involves one or more references or fixed ground-based reference stations that broadcast a difference between their positions indicated by the GPS satellites and the known fixed positions of the respective ground-based reference stations. The difference between the measured satellite pseudoranges and the actual internally stored ranges is determined and broadcast to other GPS receivers, including the GPS receivers 212, 222 of the UAV 102 and the rotorcraft 104. Therefore, the locations of the UAV 102 and the rotorcraft 104, as recited by the GPS satellites 230, can be adjusted by the same difference, thereby enhancing the locations of the UAV 102 and the rotorcraft 104. The UAV 102 and/or the rotorcraft 104 may transmit their respective locations to the remote communications station 232, which may then transmit the locations and/or flight path correction instructions to the UAV 102 and/or the rotorcraft 104. Flight path correction instructions include corrections or adjustments to the trajectory of the UAV 102 and/or the rotorcraft 104. Therefore, the location of the UAV 102 can be tracked more accurately so that the rotorcraft 104 can be more accurately positioned relative to the UAV 102 for recovery.

Additionally or alternatively, the rotorcraft 104 may use the IR camera 228 to track the location of UAV 102 (e.g., as the UAV 102 approaches). In some examples, the UAV 102 may be colored or include IR markings to increase visibility of the UAV 102 by the IR camera 228. For example, in the illustrated example, one of the wings 108 is darker in color and the other one of the wings 110 is relatively lighter in color. The contrast between the darker and lighter colors enhances the ability of the IR camera 228 to determine the location and attitude of the UAV 102. In other examples, infrared tape may be used on the UAV 102 for the IR camera 228 to determine the location and attitude of the UAV 102.

As the UAV 102 approaches the rotorcraft 104 or the recovery area, the rotorcraft 104 begins to move in the same direction of the UAV 102, which reduces the impact upon retrieval, and thereby improves operational life of the rotorcraft 104 and the UAV 102. The navigation control system 220 of the rotorcraft 104 may control the rotor assemblies of the rotorcraft 104 to fly and maneuver the rotorcraft 104. The rotorcraft 104 may be directed along a flight path that intersects an anticipated flight path of the UAV 102. In some examples, the remote communications station 232 calculates a flight path for the rotorcraft 104. In other examples, the processor 218 of the rotorcraft 104 may calculate a flight path for the rotorcraft 104 based on the relative locations of the UAV 102 and the rotorcraft 104. As the UAV 102 approaches, the locations of the UAV 102 and the rotorcraft 104 are tracked and, thus, the desired flight paths can be continuously recalculated and updated (e.g., modified, altered, adjusted). The rotorcraft 104 may adjust its flight path, speed and/or attitude based on the location of the approaching UAV 102, which may be tracked using DGPS coordinates and/or the IR camera 228. As a result, the rotorcraft 104 can more accurately track the location of the UAV 102.

FIG. 6 illustrates the example UAV 102 traveling in the close range phase 204. When the UAV 102 is in the close range phase 204, the location of the UAV 102 is tracked via measurements from the IR camera 228. As disclosed herein, the IR camera 228 can detect the location, speed, attitude, etc. of the UAV 102. In some examples, lighter and darker colors or markings are utilized on the UAV 102 to further enhance the ability of the IR camera 228 to track the UAV 102. Based on the location of the UAV 102, the rotorcraft 104 may adjust its location, speed, attitude and/or flight path for intersecting the UAV 102 at the desired recovery area (e.g., and at a desired angle and/or speed). Additionally or alternatively, the UAV 102 may be instructed to adjust its respective location, speed, attitude and/or flight path based on the relative locations of the UAV 102 and the rotorcraft 104. For example, the UAV 102 and/or the rotorcraft 104 may communicate their respective locations via the AGC systems 214, 224 to the remote communications station 232, which may then communicate the locations and/or flight path correction instructions to the UAV 102 based on the relative locations of the UAV 102 and the rotorcraft 104. As illustrated by the direction arrows, the rotorcraft 104 is controlled to move in the same direction as the UAV 102 to reduce the impact when the UAV 102 is intercepted by the rotorcraft 104. In some examples, DGPS coordinates may also be used to verify or confirm the locations of the UAV 102 and the rotorcraft 104 in the close range phase 204.

Figure 7:
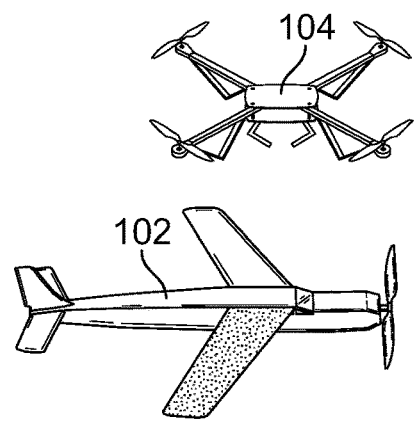
FIG. 7 illustrates the example rotorcraft and the example fixed wing UAV during the third phase of the example recovery operation illustrated in FIG. 6 as the example rotorcraft is positioned relative to the fixed wing UAV.
Figure 8:
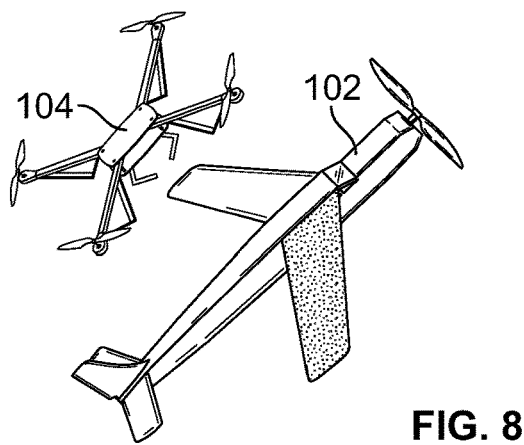
FIG. 8 illustrates the example rotorcraft and the example fixed wing UAV during the third phase of the example recovery operation illustrated in FIG. 6 as the example fixed wing UAV pitches upward.
Figure 9:
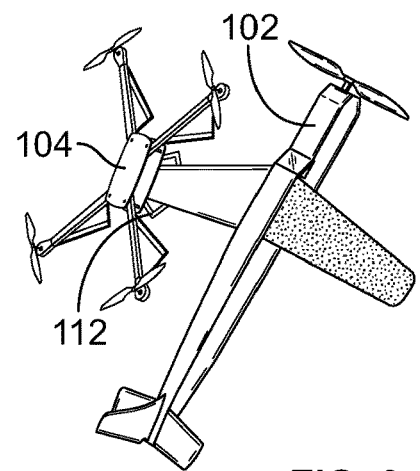
FIG. 9 illustrates the example rotorcraft and the example fixed wing UAV during the third phase of the example recovery operation illustrated in FIG. 6 as the example fixed wing UAV is coupled to the example rotorcraft.

FIGS. 7, 8 and 9 illustrate an example sequence of coupling the UAV 102 to the rotorcraft 104 mid-flight, which occurs during the close range phase 204 (FIG. 6) of the recovery operation. In the illustrated example of FIG. 7, the rotorcraft 104 is positioned along a side of the UAV 102. The rotorcraft 104 is directed along a trajectory or flight path that gradually approaches the flight path of the UAV 102. In some examples, to further reduce the forces of impact, the UAV 102 may perform an upward pitch, which may cause a stall and, thus, the UAV 102 to decrease speed, as illustrated in FIG. 8. As the UAV 102 pitches upward to stall, the rotorcraft 104 may also tilt or lean to match the pitch angle of the UAV 102. As illustrated in FIG. 9, the rotorcraft 104 then uses the gripper 112 to grasp one of the wings 108, 110 of the UAV 104. Additionally or alternatively, the gripper 112 may connect to the fuselage 106 of the UAV 102. After the UAV 102 is coupled to the rotorcraft 104, the rotorcraft 104 may slow down and carry the UAV 102 to the ground. In some examples, the rotorcraft 104 may couple to UAV 102 without pitching the UAV 102. For example, the rotorcraft 104 may travel parallel to the UAV 102 at substantially the same speed as the UAV 102, and the rotorcraft 104 may gradually approach the UAV 102 to position the gripper 112 on UAV 102.

In the illustrated example, the gripper 112 is mounted on the rotorcraft 104. However, in other examples, the gripper 112 may instead be mounted on the UAV 102. In such an example, the gripper 112 may activate to grasp or couple to the rotorcraft 104. In some examples, both the UAV 102 an the rotorcraft 104 include other mechanism(s) to couple the rotorcraft 104 and the UAV 104 such as, for example, a hook and hoop.

While an example manner of implementing the example UAV deployment and recovery system 100 of FIGS. 1-9 is illustrated in FIGS. 4, 5 and 6, one or more of the elements, processes and/or devices illustrated in FIGS. 1-9 may be combined, divided, re-arranged, omitted, eliminated and/or implemented in any other way. Further, the example processor 208, the example navigation control system 210, the example GPS receiver 212, the example AGC system 214, the example processor 218, the example navigation control system 220, the example GPS receiver 222, the example AGC system 224, the example IR camera 228, the example remote communications system 232, the example processor 236 and/or, more generally, the example system 100 of FIGS. 4-6 may be implemented by hardware, software, firmware and/or any combination of hardware, software and/or firmware. Thus, for example, any of the example processor 208, the example navigation control system 210, the example GPS receiver 212, the example AGC system 214, the example processor 218, the example navigation control system 220, the example GPS receiver 222, the example AGC system 224, the example IR camera 228, the example remote communications system 232, the example processor 236 and/or, more generally, the example system 100 of FIGS. 4-6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 208, the example navigation control system 210, the example GPS receiver 212, the example AGC system 214, the example processor 218, the example navigation control system 220, the example GPS receiver 222, the example AGC system 224, the example IR camera 228, the example remote communications system 232 and/or the example processor 236 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIGS. 4-6 may include one or more elements, processes and/or devices in addition to, or instead of, those illustrated in FIGS. 4-6, and/or may include more than one of any or all of the illustrated elements, processes and devices.

Figure 10:
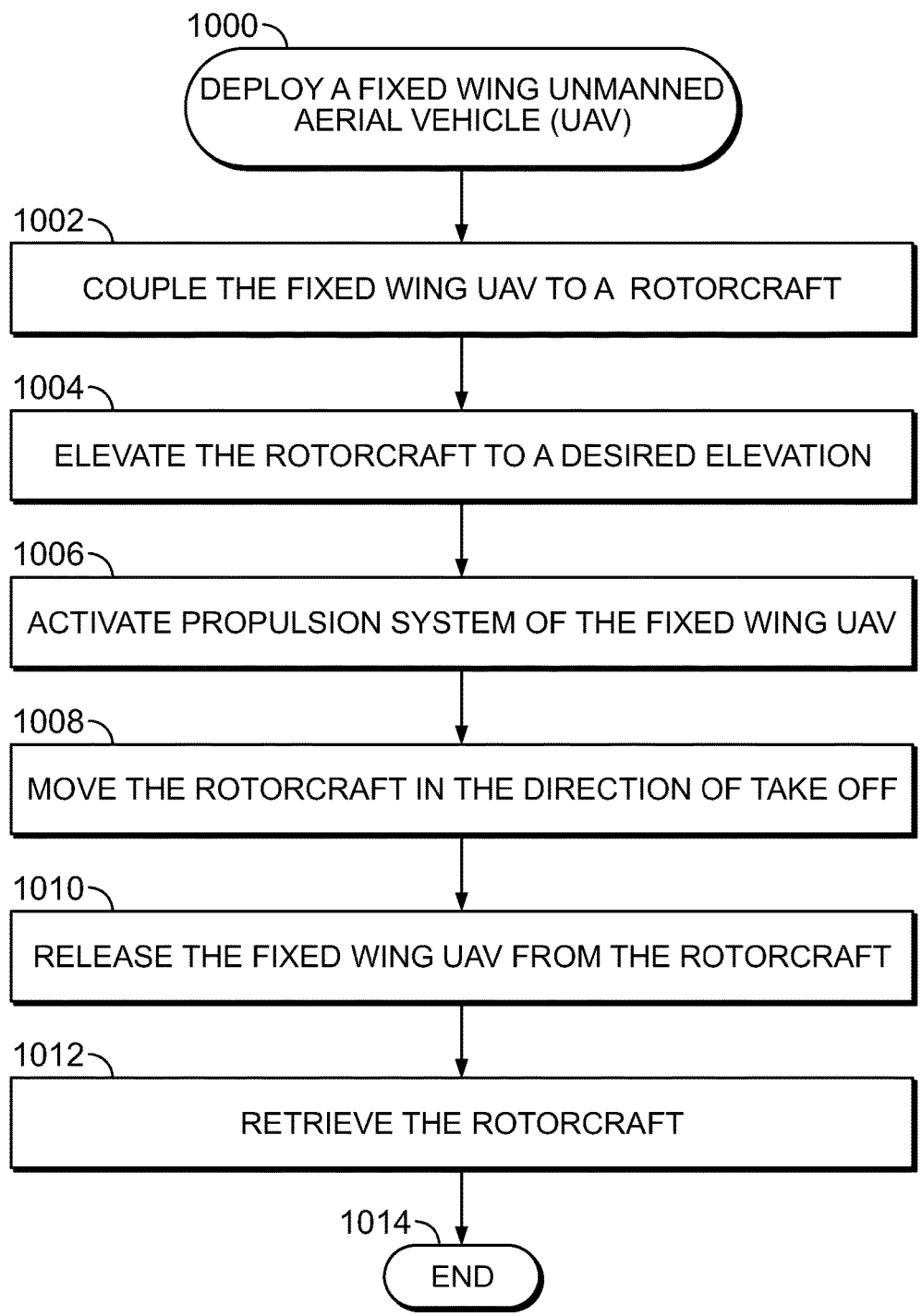
FIG. 10 is a flowchart representative of an example method of deploying a fixed wing UAV that may be performed by the example fixed wing UAV deployment and recovery system of FIG. 1 and as illustrated in the example launch operation in FIGS. 1-3.
Figure 11:
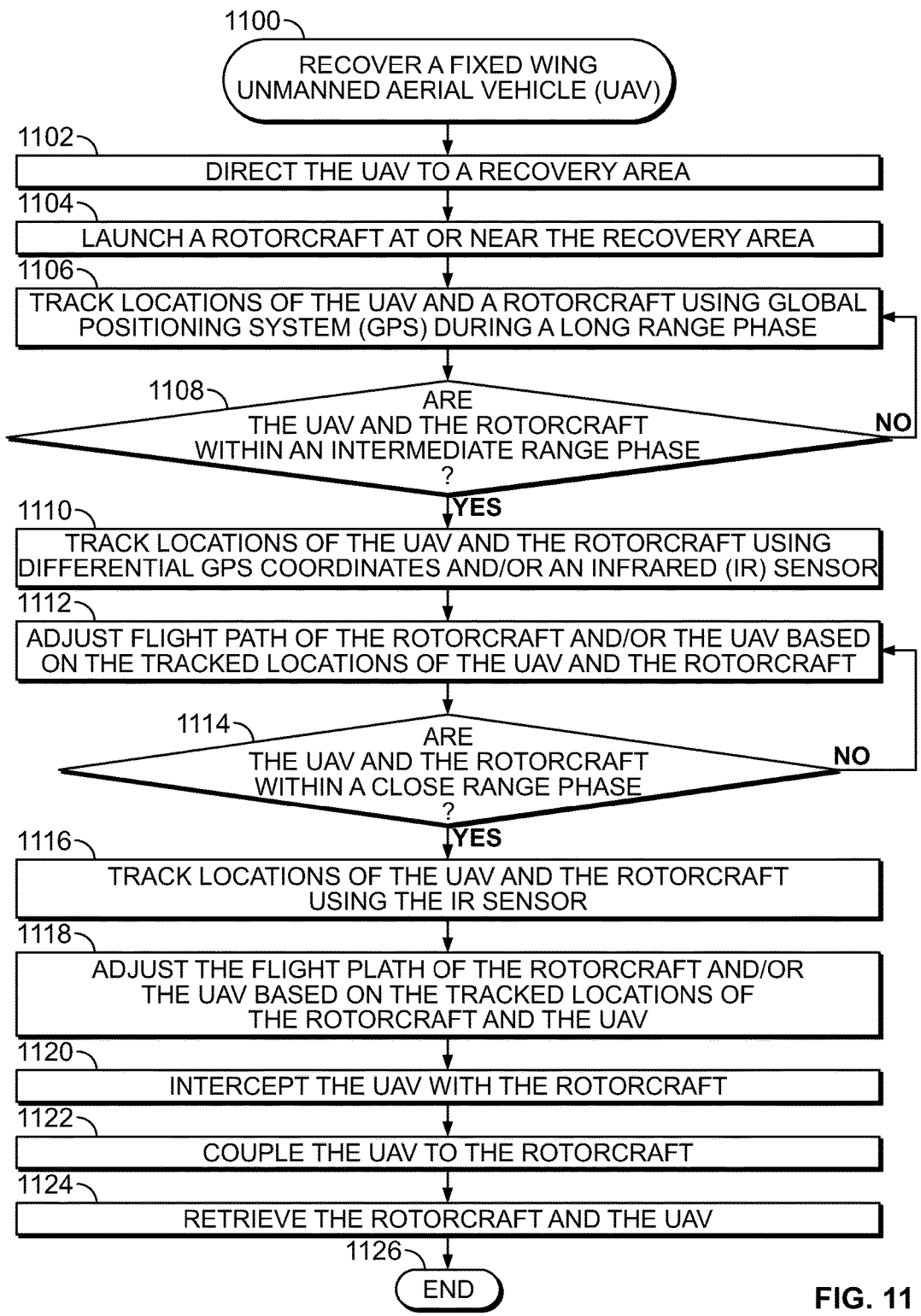
FIG. 11 is a flowchart representative of an example method of recovering a fixed wing UAV that may be performed by the example fixed wing UAV deployment and recovery system of FIGS. 1 and as illustrated in the example recovery operation in FIGS. 4-9.

A flowchart representative of an example method for implementing the system 100 of FIGS. 1-9 is shown in FIGS. 10 and 11. In this example, the method may be implemented using machine readable instructions that comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example methods are described with reference to the flowcharts illustrated in FIGS. 10 and 11, many other methods of implementing the example system 100 may alternatively be used. For example, the order of execution of the blocks may be changed, and/or some of the blocks described may be changed, eliminated, or combined.

As mentioned above, the example methods of FIGS. 10 and 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 10 and 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 10 is a flowchart illustrating an example method 1000 of deploying a fixed wing UAV that may be implemented by the example UAV deployment and recovery system 100 illustrated in FIGS. 1-9 and as illustrated in the example sequence of FIGS. 1-3. The example method 1000 includes coupling the fixed wing UAV to a rotorcraft (e.g., a non-fixed wing aircraft) (block 1002). In some examples, the rotorcraft is also a UAV. A gripper (e.g., a claw) may be used to couple the fixed wing UAV and the rotorcraft. For example, as illustrated in the example system 100 in FIG. 1, the rotorcraft 104 includes the gripper 112, which may grasp one of the wings 108, 110 of the UAV 102. Additionally or alternatively, the gripper 112 may be designed to couple to the fuselage 106 or any other part of the UAV 102.

The example method 1000 includes elevating the rotorcraft to a desired elevation (block 1004). For example, as illustrated in the example system 100 in FIG. 1, the rotorcraft 104 carries the UAV 102 vertically upward to a desired elevation to be deployed or launched. The rotorcraft 104 may be controlled via a remote control system (e.g., the remote communications station 232 (FIG. 4)) and/or may be programmed with instructions to carry the UAV 102 to the desired elevation. The example method 1000 includes activating a propulsion system of the fixed wing UAV (block 1006). The UAV may be powered via a propeller, turbo-jet or other thrust generation device.

The example method 1000 of FIG. 10 includes moving the rotorcraft in the direction of take off (block 1008). For example, as illustrated in the example system 100 in FIG. 2, the rotorcraft 104 moves in the direction in which the UAV 102 is pointing. In some examples, the thrust generated by the UAV 102 moves the rotorcraft 104. The example method 1000 includes releasing the UAV from the rotorcraft (block 1010). As disclosed herein, the rotorcraft may employ a gripper (e.g., a claw) to carry the UAV. In such an example, the gripper may release or disengage from the UAV to deploy the UAV. For example, as illustrated in the example system 100 in FIG. 3, the gripper 112 of the rotorcraft 104 releases the wing 110 of the UAV 102. The example method 1000 includes retrieving the rotorcraft (block 1012). For example, the rotorcraft 104 may then be landed. Once the UAV is released, the method 1000 ends (block 1014).

FIG. 11 is a flowchart illustrating an example method 1100 of recovering a fixed wing UAV from flight that may be implemented by the example UAV deployment and recovery system 100 illustrated in FIGS. 1-9 and as illustrated in the example sequence of FIGS. 4-9. The example method includes directing the UAV to a recovery area (block 1102). The UAV may be programmed to fly toward the recovery area (e.g., via flight intent instructions) and/or may be controlled manually (e.g., via a remote communications station). For example, in the system 100 illustrated in FIG. 4, the UAV 102 includes the processor 208 and the navigation control system 210. The processor 208 determines a flight path for the UAV 102 and the navigation control system 210 controls the motorized equipment (e.g., flaps, elevators, propellers, etc.) of the UAV 102 to fly the UAV 102 according to the flight path.

The example method 1100 includes launching a rotorcraft (e.g., a non-fixed wing aircraft) at or near the recovery area (block 1104). For example, in the system 100 illustrated in FIG. 4, the rotorcraft 104 is launched at the recovery area. The example method 1100 includes tracking locations of the UAV and the rotorcraft using GPS during a long range phase (block 1106). In some examples, the long range phase occurs when the UAV is 100 or more yards from the rotorcraft (or the recovery area). However in other examples, the distance of the long range phase may be more or less than 100 yards. The UAV and the rotorcraft may have GPS receivers that detect their corresponding locations. The UAV and the rotorcraft may then transmit their respective locations to a ground or base station and/or to each other. For example, in the system 100 illustrated in FIG. 4, the locations of the UAV 102 and the rotorcraft 104 are tracked based on GPS coordinates. The UAV 102 and the rotorcraft 104 include the respective GPS receivers 212, 222 that determine the respective locations of the UAV 102 and the rotorcraft 104. The UAV 102 and the rotorcraft 104 may communicate their respective coordinates via the AGC systems 214, 224 to the remote communications station 232. The remote communications station 232 may determine a flight path for the UAV 102 and transmit flight path instructions to the UAV 102 to direct the UAV 102 to the recovery area (e.g., towards the rotorcraft 104). In other examples, the location of the rotorcraft 104 is transmitted to the UAV 102, which determines a flight path to the recovery area. In some examples, the UAV 102 is manually controlled (e.g., via a remote controller). In other examples, flight intent instructions may be transmitted via the antenna(s) 234 to the UAV 102.

The example method 1100 includes determining whether the UAV is in an intermediate range phase (block 1108). The intermediate rang phase may be, for example, 50-100 yards between the UAV and the rotorcraft. If the UAV 102 is not within the intermediate range phase, the example method 1100 includes further tracking the locations of the UAV and the rotorcraft using GPS (block 1106).

If it determined that the UAV is within the intermediate phase range, the example method 1100 includes tracking the locations of the UAV and the rotorcraft using DGPS coordinates and/or an IR sensor (block 1110). The UAV and rotorcraft may include GPS receivers that can receive DPGS signals to track their respective locations. Additionally or alternatively, the rotorcraft may include an IR camera to track the location of the UAV. The rotorcraft and the UAV may communicate their respective locations to a ground or base station (e.g., via respective AGC systems). As disclosed herein, in some instances GPS tracking is only accurate within a nominal range. Therefore, to more accurately track the locations of the UAV and the rotorcraft, DGPS tracking and/or IR camera tracking may be implemented. For example, in the system 100 of FIG. 5, the UAV 102 and the rotorcraft 104 include the respective GPS receivers 212, 222 and the respective AGC systems 214, 224. The locations of the rotorcraft 104 and/or the UAV 102 may be determined based on DGPS coordinates using the respective GSP receivers 212, 222 and communicated to the remote communication station 232. In the illustrated example of FIG. 5, the rotorcraft 104 includes the IR camera 228, which may be employed to track the location of the UAV 102. In some examples, the UAV 102 includes colored wings to enhance the ability of the IR camera 228 to measure the location and attitude of the UAV 102. In some examples, during the intermediate phase range 202, the rotorcraft 104 may also start moving in the same direction as the UAV 102. In other words, the rotorcraft 104 may be directed along a flight path that gradually approaches the flight path of the UAV 102.

The example method 1100 includes adjusting a flight path of the rotorcraft and/or the UAV based on the tracked locations of the UAV and the rotorcraft (block 1112). As mentioned above, the rotorcraft may be directed to fly along a flight path that intersects the anticipated flight path of the UAV. The location, speed and/or attitude of the rotorcraft and/or the UAV may change throughout flight due to changes in weather and other factors. As such, the flight path of the rotorcraft can be altered based on the updated locations as tracked in block 1110. Additionally or alternatively, the flight path of the UAV can be adjusted (e.g., via correct flight intent instructions).

The example method 1100 includes determining whether the UAV is in a close range phase (block 1114). The close range phase may be, for example, less than 50 yards between the UAV and the rotorcraft. If the UAV is not in the close range phase, the method 1100 includes further tracking the locations of the UAV and the rotorcraft using DGPS coordinates and/or the IR sensor.

If is determined that the UAV is within the close phase range, the example method 1100 includes tracking the locations (e.g., the relative locations) of the UAV and the rotorcraft using the IR sensor (block 1116). For example, as illustrated in the example system 100 in FIG. 6, the rotorcraft 104 may use the IR camera 228 to detect the location and attitude of the UAV 102. The example method 1100 includes adjusting the flight path of the rotorcraft and/or the UAV based on the tracked locations of the rotorcraft and/or the UAV (1118). For example, the rotorcraft 104 may be directed to fly along a flight path that gradually approaches or intersects the flight path of the UAV 102. As the rotorcraft 104 and the UAV 102 near each other, the flight path of the rotorcraft 104 may be adjusted based on the location of the UAV 102 as measured by the IR camera 228.

The example method 1100 includes intercepting the UAV with the rotorcraft (block 1120) and coupling the UAV to the rotorcraft (block 1122). In some examples, the rotorcraft includes a gripper (e.g., a claw) that may be activated to grasp the UAV. For example, as illustrated in FIGS. 7-9, the rotorcraft 104 includes the gripper 112 that is activated to grab one of the wings 108, 110 of the UAV 102. As the rotorcraft 104 and the UAV 102 intersect flight paths, the gripper 112 grabs the UAV 102. In some examples, the UAV 102 performs a pitch up maneuver to slow the UAV 102. In other examples, the rotorcraft 104 and the UAV 102 may remain substantially horizontal. The example method 1100 includes retrieving the rotorcraft and the UAV (block 1124). Once the UAV is coupled to the rotorcraft, the UAV may be powered down or decrease in speed. The rotorcraft, along with the UAV, may then be landed to retrieve both the rotorcraft and the UAV. In some examples, after grasping the UAV, the rotorcraft descends along a parabolic arc to the ground (e.g., in a single smooth motion). Once the rotorcraft and the UAV are retrieved, the example method 1100 ends (block 1126).

Figure 12:
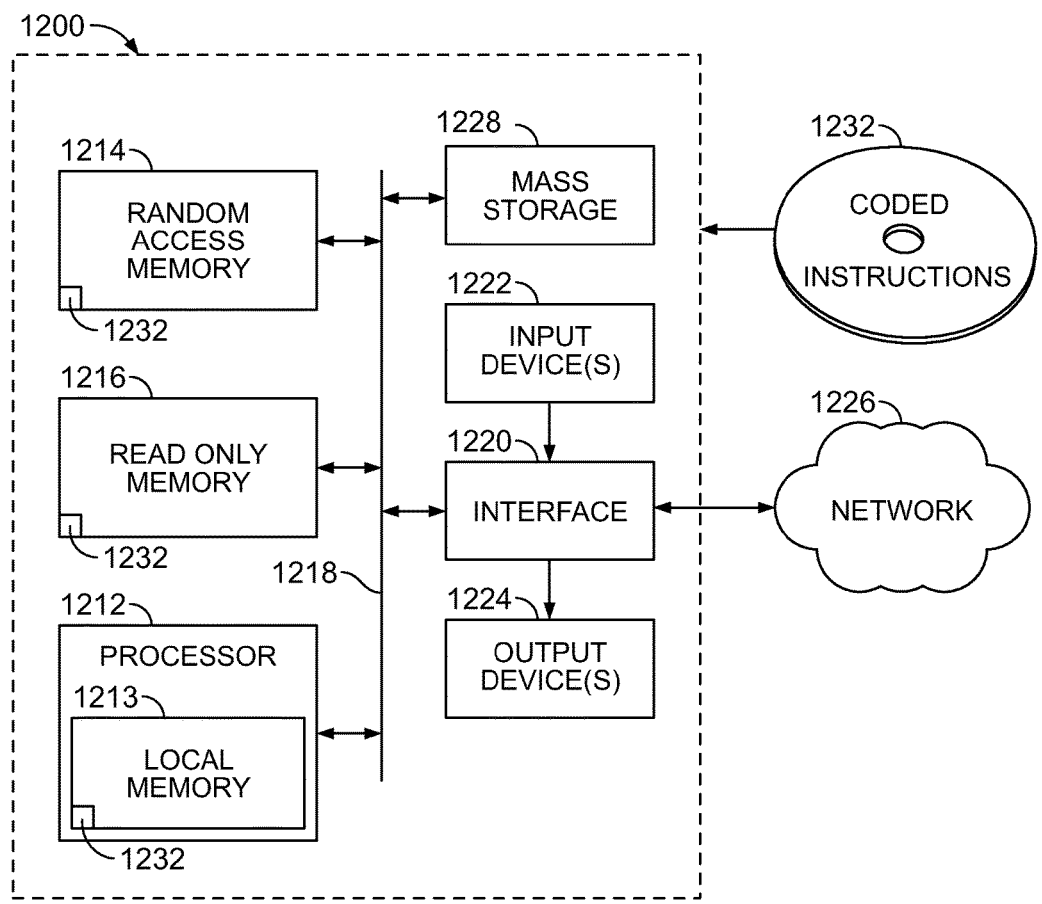
FIG. 12 is a diagram of a processor platform for use with the examples disclosed herein.

FIG. 12 is a block diagram of an example processor platform 1200 capable of executing the instructions to implement the methods of FIGS. 10 and 11 and the system 100 of FIGS. 1-9. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1012 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1020. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device (s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

Coded instructions 1232 to implement the methods 1000 and 1100 of FIGS. 10 and 11 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods and apparatus enable a fixed wing UAV to be deployed and recovered within a relatively smaller area than many known systems. As a result, the UAV can be launched in environments that would typically prevent a normal runway launch. The example apparatus provide a significantly more mobile platform for launching and recovering a fixed wing UAV. Further, the example methods and apparatus employ the same device, i.e., a rotorcraft, to launch and recover the UAV. Therefore, separate launch and recovery systems are not required to complete a full launch and recovery operation.

Although certain example apparatus and methods, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
tracking a location of a non-fixed wing aircraft in flight;
tracking a location of a fixed wing aircraft in flight;
positioning the non-fixed wing aircraft relative to the fixed wing aircraft based on the locations of the non-fixed wing aircraft and the fixed wing aircraft;
performing, with the fixed wing aircraft, a first upward pitch maneuver that causes the fixed wing aircraft to stall to decrease a speed of the fixed wing aircraft prior to coupling the non-fixed wing aircraft to the fixed wing aircraft;
performing, with the non-fixed wing aircraft, a second upward pitch maneuver that matches a pitch angle of the fixed wing aircraft in the first upward pitch maneuver; and
while the fixed wing aircraft performs the first upward pitch maneuver, closing a gripper, carried on the non-fixed wing aircraft, onto a wing of the fixed wing aircraft in mid-flight.

2. The method of claim 1, wherein, when the fixed wing aircraft is a first distance from the non-fixed wing aircraft, tracking the locations of the non-fixed wing aircraft and the fixed wing aircraft includes using a Global Positioning System (GPS) to track the locations of the non-fixed wing aircraft and the fixed wing aircraft.

3. The method of claim 2, wherein, when the fixed wing aircraft is a second distance from the non-fixed wing aircraft, tracking the location of the fixed wing aircraft includes using an infrared (IR) sensor to track the location of the fixed wing aircraft.

4. The method of claim 3, wherein the second distance is less than the first distance.

5. The method of claim 2, wherein using the GPS includes using a differential Global Positioning System (DGPS).

6. The method of claim 2 further including communicating the location of the fixed wing aircraft to a remote communications station when the fixed wing aircraft is the first distance from the non-fixed wing aircraft.

7. The method of claim 1, wherein the fixed wing aircraft and the non-fixed wing aircraft are unmanned aerial vehicles (UAVs).

8. An apparatus comprising:
a non-fixed wing aircraft having a gripper; and
a processor to:
determine a location of the non-fixed wing aircraft;
determine a location of a fixed wing aircraft to be retrieved by the non-fixed wing aircraft;
instruct the non-fixed wing aircraft to a position relative to the fixed wing aircraft;
instruct the fixed wing aircraft to perform a first upward pitch maneuver that causes the fixed wing aircraft to stall to slow the fixed wing aircraft prior to coupling the non-fixed wing aircraft to the fixed wing aircraft;
instruct the non-fixed wing aircraft to perform a second upward pitch maneuver that matches a pitch angle of the fixed wing aircraft in the first upward pitch maneuver; and
instruct the non-fixed wing aircraft to close the gripper onto a wing of the fixed wing aircraft while the fixed wing aircraft performs the first upward pitch maneuver and the non-fixed wing aircraft performs the second upward pitch maneuver.

9. The apparatus of claim 8, wherein the processor is to determine the locations of the non-fixed wing aircraft and the fixed wing aircraft based on coordinates from a Global Positioning System (GPS) when the fixed wing aircraft is a first distance from the non-fixed wing aircraft.

10. The apparatus of claim 9, wherein the non-fixed wing aircraft includes an infrared (IR) camera.

11. The apparatus of claim 10, wherein the processor is to determine the location of the fixed wing aircraft based on coordinates from the IR camera when the fixed wing aircraft is a second distance from the non-fixed wing aircraft, the second distance less than the first distance.

12. The apparatus of claim 8, wherein the processor is located at a remote communications station.

13. A method comprising:
instructing a fixed wing aircraft to fly towards an area in which the fixed wing aircraft is to be recovered;
tracking a location of the fixed wing aircraft using a Global Positioning System (GPS) receiver in the fixed wing aircraft when the fixed wing aircraft is within a first range of a non-fixed wing aircraft;
determining when the fixed wing aircraft is within a second range of the non-fixed wing aircraft, the second range less than the first range;
tracking the location of the fixed wing aircraft using an infrared (IR) camera, carried by the non-fixed wing aircraft, when the fixed wing aircraft is determined to be within the second range of the non-fixed wing aircraft; and
retrieving the fixed wing aircraft with the non-fixed wing aircraft mid-flight by:
instructing the fixed wing aircraft to perform a first upward pitch maneuver to cause the fixed wing aircraft to stall to decrease a speed of the fixed wing aircraft prior to coupling the non-fixed wing aircraft to the fixed wing aircraft;
instructing the non-fixed wing aircraft to perform a second upward pitch maneuver that matches a pitch angle of the fixed wing aircraft in the first upward pitch maneuver; and
instructing the non-fixed wing aircraft to close a gripper, carried by the non-fixed wing aircraft, onto the fixed wing aircraft while the fixed wing aircraft is pitched upward.

14. The method of claim 13 further including:
positioning the non-fixed wing aircraft relative to the fixed wing aircraft based on the location of the fixed wing aircraft.

15. The method of claim 13, wherein a first wing of the fixed wing aircraft is darker in color than a second wing of the fixed wing aircraft such that the IR camera can detect the location of the fixed wing aircraft in the second range.

* * * * *